US008705103B2

(12) United States Patent
Yoshida et al.

(10) Patent No.: US 8,705,103 B2
(45) Date of Patent: Apr. 22, 2014

(54) IMAGE PROCESSING SYSTEM, IMAGE PROCESSING SERVER, IMAGE FORMING APPARATUS, IMAGE PROCESSING METHOD, AND RECORDING MEDIUM

(75) Inventors: Eiichi Yoshida, Toyokawa (JP); Takuya Okada, Toyokawa (JP); Toshimi Shinchi, Toyokawa (JP); Kenichi Komaba, Toyokawa (JP); Masao Hosono, Toyokawa (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 269 days.

(21) Appl. No.: 13/295,526

(22) Filed: Nov. 14, 2011

(65) Prior Publication Data

US 2012/0120447 A1    May 17, 2012

(30) Foreign Application Priority Data

Nov. 16, 2010    (JP) ................. 2010-256360

(51) Int. Cl.
  *G06F 3/12*    (2006.01)
  *G06K 15/00*    (2006.01)

(52) U.S. Cl.
  USPC .................... 358/1.15; 358/1.14; 358/1.13

(58) Field of Classification Search
  None
  See application file for complete search history.

(56) References Cited

U.S. PATENT DOCUMENTS

| 2006/0110171 | A1 | 5/2006 | Miyazawa et al. |
| 2006/0126096 | A1 | 6/2006 | Yasukaga et al. |
| 2007/0127059 | A1 | 6/2007 | Honda et al. |
| 2008/0013727 | A1 | 1/2008 | Uemura |
| 2010/0188684 | A1* | 7/2010 | Kumara ................... 358/1.14 |
| 2011/0038015 | A1* | 2/2011 | Tsujita ..................... 358/448 |
| 2012/0162682 | A1* | 6/2012 | Tomiyasu et al. ........ 358/1.13 |
| 2012/0314242 | A1* | 12/2012 | Kakutani ................. 358/1.14 |

FOREIGN PATENT DOCUMENTS

| CN | 1979567 A | 6/2007 |
| CN | 101146168 A | 3/2008 |
| JP | 2004-289500 A | 10/2004 |
| JP | 2006-135697 A | 5/2006 |
| JP | 2006-163982 A | 6/2006 |

(Continued)

OTHER PUBLICATIONS

Office Action (Notice of Reasons for Refusal) dated Nov. 6, 2012, issued in corresponding Japanese Patent Application No. 2010-256360, and an English Translation thereof. (6 pages).

(Continued)

*Primary Examiner* — Dov Popovici
(74) *Attorney, Agent, or Firm* — Buchanan Ingersoll & Rooney PC

(57) ABSTRACT

An image processing system includes an image forming apparatus and first and second image processing servers connected to the image forming apparatus via a network, the first image processing server includes: a first image processor which performs a first image processing operation on target image data received from the image forming apparatus; and a protected area calculator which calculates a protected area to be prohibited from being processed next, which is related to the area processed by the first image processor, and generates image protection information including information of the protected area, and the second image processing server includes a second image processor which performs a second image processing operation on the areas excluding the protected area whose information is included in the image protection information generated by the protected area calculator.

20 Claims, 13 Drawing Sheets

(56) References Cited

FOREIGN PATENT DOCUMENTS

| JP | 2006-166156 A | 6/2006 |
| JP | 2006-195893 A | 7/2006 |
| JP | 2006-268467 A | 10/2006 |
| JP | 2009-129340 A | 6/2009 |
| JP | 2010-026562 A | 2/2010 |

OTHER PUBLICATIONS

Chinese Office Action (The First Office Action) dated Jan. 6, 2014, issued by the State Intellectual Property Office of People's Republic of China in corresponding Chinese Patent Application No. 201110362704.X, and English language translation of Office Action. (28 pages).

* cited by examiner

| Order of Service | Transfer Port | Name of Service |
|---|---|---|
| 1 | http://www.service1.or.jp/image/ | Code Merging |
| 2 | http://www.service2.or.jp/image/ | OCR&Translation |
| 3 | http://www.service3.or.jp/image/ | Image Adjustment |

| Page No. | Protected Area 1 | Protected Area 2 | Protected Area n |
|---|---|---|---|
| 1 | X=10,Y=20 : X=50,Y=100 | X=30,Y=70 : X=200,Y=300 | ... |
| 2 | X=10,Y=20 : X=50,Y=100 | N/A | |
| 3 | X=30,Y=70 : X=200,Y=30 | N/A | | though there were

IMAGE PROCESSING SYSTEM, IMAGE PROCESSING SERVER, IMAGE FORMING APPARATUS, IMAGE PROCESSING METHOD, AND RECORDING MEDIUM

This application claims priority under 35 U.S.C. §119 to Japanese Patent Application No. 2010-256360 filed on Nov. 16, 2010, the entire disclosure of which is incorporated herein by reference in its entirety.

BACKGROUND OF THE INVENTION

1. Field of the Invention

The present invention relates to: an image processing system in which an image forming apparatus such as a multi-functional digital machine also called as MFP (Multi Function Peripheral) and one or more than one image processing server are connected to each other via a network; an image processing server preferably employed in the image processing system; an image forming apparatus also preferably employed in the image processing system; an image processing method for the image processing system; and a recording medium with an image processing program being stored thereon to make a computer of the image processing server execute processing.

2. Description of the Related Art

The following description sets forth the inventor's knowledge of related art and problems therein and should not be construed as an admission of knowledge in the prior art.

As well as such an image processing system mentioned above which is configured to make an image forming apparatus perform all image processing operations on image data inputted to the image forming apparatus, there has been a suggested image processing system which is configured to make multiple external image processing servers cooperatively perform their own and different image processing operations on image data inputted to an image forming apparatus (for example, Japanese Unexamined Patent Publications No. 2004-289500 and No. 2009-129340).

For example, such an image processing system is capable of making: an image processing server with OCR (Optical Character Recognition) function perform an OCR operation on image data obtained by scanning a document with a scanner of an image forming apparatus; an image processing server with translation function translate the recognized characters; and an image processing server with code merging function merge a QR code to the image data obtained by the translation. In such an image processing system which makes multiple image processing servers with specific functions cooperatively perform their specific operations individually, an image forming apparatus, whose resources are too limited to perform all image processing operations, does not have to employ a complex structure with the capability to perform all these functions, which is very advantageous.

And recently, there has been another suggested image processing system, which provides image processing services of various service suppliers via the Web so that users can select their preferred ones among them and obtain their target image via the Web, just like SaaS (Software as a Service).

However, the conventional image processing systems to make an external image processing server(s) perform image processing, including the technologies described in the above-introduced Japanese Unexamined Patent Publications No. 2004-289500 and No. 2009-129340, have the following disadvantage.

When multiple image processing servers cooperatively perform image processing operations on image data, the user has to be afraid if the image data could be processed to be an unintended form depending on the order of the image processing operations.

For example, a first image processing server merges an image pattern 101 such as a security code or a QR code to target image data 100 as illustrated in FIG. 19A, which is a conventional method to protect handout documents. However, there is a problem with the conventional method that if a second image processing server performs the next image processing operation after the code merging operation of the first image processing apparatus, the security code or the QR code might hardly be detected because of being unfavorably converted by the operation of the second image processing server as illustrated in FIG. 19B. There is another problem with the conventional method that the second image processing server might wrongly translate the security code 103 after the code merging operation of the first image processing apparatus, as illustrated in FIG. 19C.

Specifically from the aspect of document protection, security codes or QR codes have been used and needed in more cases for recent years; accordingly there will be increasing such problems as mentioned above.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

In a first aspect, the present invention relates to an image processing system comprising:
an image forming apparatus; and
first and second image processing servers connected to the image forming apparatus via a network,
the first image processing server comprising:
 a first image processor which performs a first image processing operation on target image data received from the image forming apparatus; and
 a protected area calculator which calculates a protected area to be prohibited from being processed next, which is related to the area processed by the first image processor, and generates image protection information including information of the protected area, and
the second image processing server comprising a second image processor which performs a second image processing operation on the areas excluding the protected area whose information is included in the image protection information generated by the protected area calculator.

In a second aspect, the present invention relates to an image processing system comprising:
an image forming apparatus; and
an image processing server connected to the image forming apparatus via a network, performing multiple image processing operations on target image data received from the image forming apparatus,
the image processing server comprising:
a first image processor which performs a first image processing operation;
a protected area calculator which calculates a protected area to be prohibited from being processed next, which is related to the area processed by the first image processor, and generates image protection information including information of the protected area; and a second image processor which subsequently performs a second image processing operation on the areas excluding the protected area whose information is included in the image protection information generated by the protected area calculator.

In a third aspect, the present invention relates to an image processing server comprising:

an image processor which performs an image processing operation on target image data received from an image forming apparatus which is connected to the image processing server via a network;

a protected area calculator which calculates a protected area to be prohibited from being processed next, which is related to the area processed by the image processor, and generates image protection information including information of the protected area; and a transmitter which transmits the image data processed by the image processor and the image protection information generated by the protected area calculator, to any of the following destinations: a second image processing server which subsequently performs a second image processing operation, the image forming apparatus which is allowed to transfer them to the second image processing server, and an intermediate server which is provided between the image forming apparatus and the group of the image processing servers.

In a fourth aspect, the present invention relates to an image forming apparatus employed in an image processing system comprising:

this image forming apparatus; and first and second image processing servers connected to the image forming apparatus via a network, performing different image processing operations in a predetermined order on target image data received from this image forming apparatus, the image forming apparatus comprising:

an area setting portion which determines target areas to be processed by the first and second image processing servers and protected areas to be prohibited from being processed by the first and second image processing servers; and a transmitter which transmits the target image data and information indicating the target areas and the protected areas both determined by the area setting portion, to the first and second image processing servers.

In a fifth aspect, the present invention relates to an image processing method implemented by an image processing system comprising:

an image forming apparatus; and first and second image processing servers connected to the image forming apparatus via a network, the image processing method comprising:

the first image processing server's:

performing a first image processing operation on target image data received from the image forming apparatus; and calculating a protected area to be prohibited from being processed next, which is related to the area processed by the first image processing operation, and generating image protection information including information of the protected area, and the second image processing server's performing a second image processing operation on the areas excluding the protected area whose information is included in the image protection information generated by the first image processing server.

In a sixth aspect, the present invention relates to a non-transitory computer-readable recording medium having an image processing program stored thereon to make a computer controlling image processing server execute:

performing an image processing operation on target image data received from an image forming apparatus connected to the image processing server via a network;

calculating a protected area to be prohibited from being processed next, which is related to the area processed by the image processing operation, and generating image protection information including information of the protected area; and transmitting the image data obtained by the image processing operation and the generated image protection information, to any of the following destinations: a second image processing server which subsequently performs a second image processing operation, the image forming apparatus which is allowed to transfer them to the second image processing server, and an intermediate server which is provided between the image forming apparatus and the group of the image processing servers.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, one mode of implementing the present invention will be described with reference to the accompanying drawings.

Figure 1:
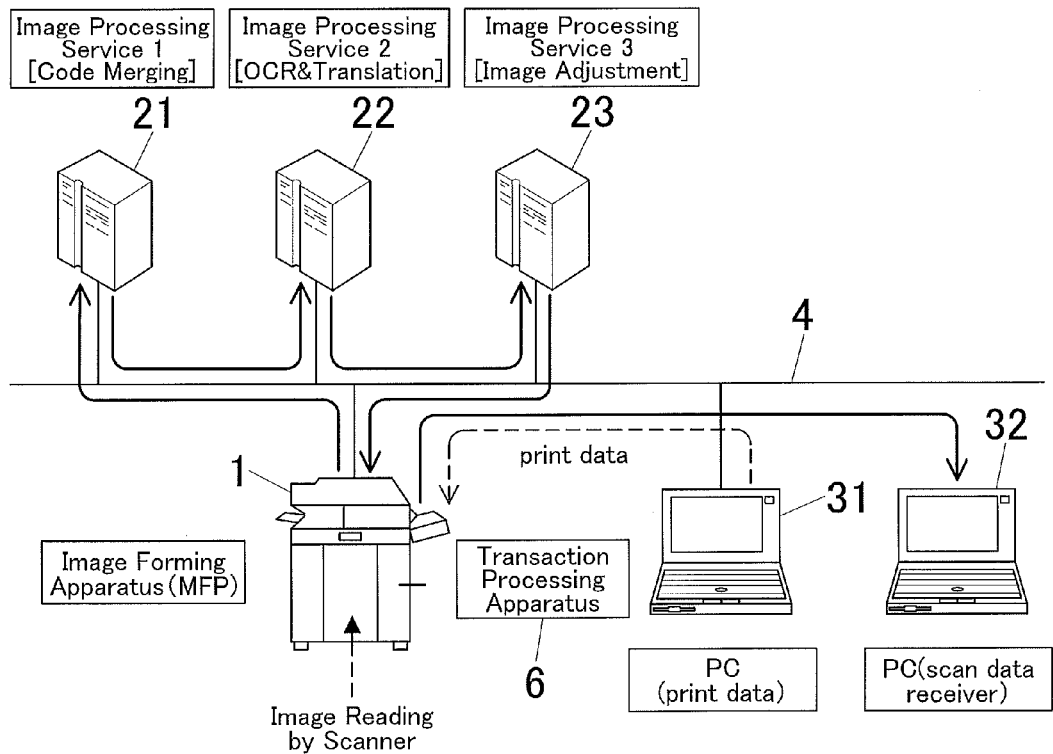
FIG. 1 is a view illustrating a configuration of an image processing system according to one mode of implementing the present invention.

FIG. 1 is a view illustrating a configuration of an image processing system according to one mode of implementing the present invention.

As illustrated in FIG. 1, the image processing system is provided with: an image forming apparatus 1; multiple image processing servers 21, 22, and 23 (three image processing servers according to this mode of implementation); and multiple terminals 31 and 32 which are PCs owned by users, all of which are connected to each other via a network 4.

According to this mode of implementation, the multiple image processing servers 21, 22, and 23 are configured to provide image processing services, cooperatively performing their own image processing operations on image data read out from a document by the image forming apparatus 1 or print data received from the terminals 31 and 32, in the predetermined order.

More specifically, the image processing server 21 is in charge of an image processing service 1, a code merging operation for merging to target image data, a security code for protecting a document or a QR code for tracking a document, for example.

The image processing server 22 is in charge of an image processing service 2, an optical character recognition (OCR) and translation operation. In other words, the image processing server 22 extracts text from the image data obtained by the code merging operation and replaces it with translation text.

The image processing server 23 is in charge of an image processing service 3, an image adjustment operation for adjusting for example color and tonality of the image data obtained by the optical character recognition and translation operation and returning it to the image forming apparatus 1.

The image forming apparatus 1, as which a MFP, a multi-functional digital machine is employed according to this mode of implementation, gives an instruction to cooperatively perform image processing to the image processing servers 21, 22, and 23; the image forming apparatus 1 has a copier function, a scanner function, a facsimile (FAX) function, a printer function, a memory function, and the like.

Figure 2:
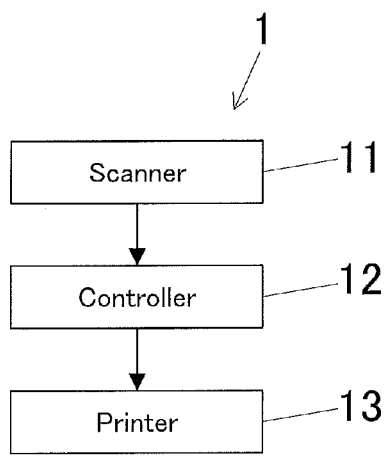
FIG. 2 is a block diagram illustrating a configuration of an image forming apparatus employed in the image processing system of FIG. 1.

FIG. 2 is a block diagram illustrating a configuration of the image forming apparatus 1.

The image forming apparatus 1 is provided with: a scanner 11 for reading an image of a document and converting it to image data, i.e. electronic data; a controller 12 for performing operations on the image data obtained by the scanner 11 and transmitting it to a printer 13; and a printer 13 for printing out on paper image data received from the controller 12.

Figure 3:
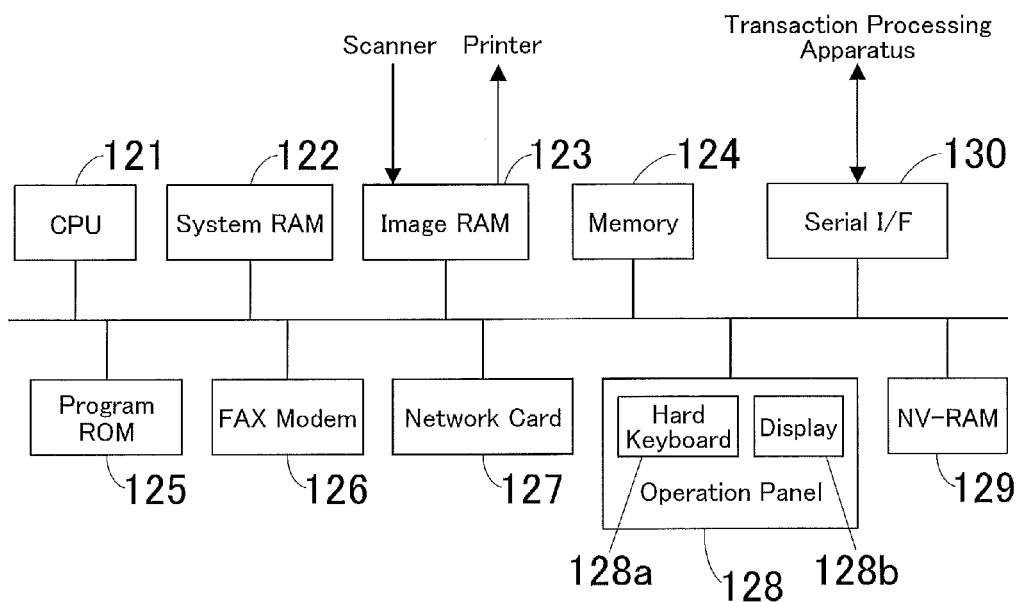
FIG. 3 is a block diagram illustrating in detail a controller of the image forming apparatus.

FIG. 3 is a block diagram illustrating in detail the controller 12 mentioned above.

The controller 12 is provided with: a CPU 121, a system RAM 122, an image RAM 123, a memory 124, a program ROM 125, a FAX modem 126, a network card 127, an operation panel 128, a NV-RAM 129, a serial interface (serial I/F) 130, and the like.

The CPU 121 integrally controls the entire image forming apparatus 1 by executing the various functions of the image forming apparatus 1 including a copier function, a printer function, a FAX function, and the like. Specifically, in this mode of implementation, the CPU 121 further performs the following control operations: generating service information (to be detailed later) indicating the user's specified order of multiple image processing services; transmitting target image data and the generated service information to the image processing server 21 which is in charge of the first image processing service; and specifying a target area whose image needs to be processed by the image processing server 21.

The system RAM 122 cumulatively stores necessary data for the CPU 121 to execute operation programs, and temporarily keeps a memory area while the operation programs are active.

The image RAM 123 is a memory which temporarily stores image data received from the scanner 11 or the like.

A hard disk drive (HDD), for example, constitutes the memory 124; the memory 124 stores image data received from the scanner 11 or the like, application programs, and other data. Specifically, in this mode of implementation, the memory 124 further stores the details of the available image processing services obtained from the image processing servers 21, 22, and 23, registered thereon.

The program ROM 125 is a memory which stores operation programs for the CPU 121. The program ROM 125 further stores programs to control the display and the key input on the operation panel 128, graphic data to display keys on a display 128b of the operation panel 128, "key management information" defining how to react with key presses.

The FAX modem 126 is a device which transmits and receives FAX; the network card 127 serves as a communicator which performs communication with the image processing server 21, 22, and 23 and external machines such as the terminals 31 and 32, via the network 4.

The operation panel 128, which is provided with a hard keyboard 128a including a Start key, a Stop key, a numeric keypad, and the like, allows users to operate the image forming apparatus 1; a display 128b, which is a liquid crystal display with touch-panel functionality, displays messages, operation status, and soft keys for users.

The NV-RAM 129 is a memory which stores nonvolatile information and the like specified by users.

The serial I/F 130 is an interface which transmits and receives charging information to and from a transaction processing apparatus 6. The transaction processing apparatus 6 performs an operation to charge a fee for the used image processing services; instead of the transaction processing apparatus 6, the image processing servers 21, 22, and 23 may perform such an operation.

When a copier function is executed on the image forming apparatus 1, image data obtained by the scanner 11 is temporarily stored on the image RAM 123. And then the image data is transmitted to the printer 13 to be printed out.

When a scanner function is executed on the image forming apparatus 1, image data obtained by the scanner 11 is temporarily stored on the image RAM 123. And the image data is read out by the CPU 121 to be encoded to an all-purpose image form. And then the image data can be externally transmitted over e-mail or FTP protocol from the network card 127.

When a FAX transmitting function is executed on the image forming apparatus 1, image data obtained by the scanner 11 is temporarily stored on the image RAM 123. And the image data is converted to a suitable resolution and a compressed form by the CPU 121 so as to be transmitted by FAX, then externally transmitted via the FAX modem 126.

When a FAX receiving function is executed on the image forming apparatus 1, image data received via the FAX modem 126 is temporarily stored on the image RAM 123. And the image data is converted to a suitable form by the CPU 121, then transmitted to the printer 13 to be printed out.

When a printer function is executed on the image forming apparatus 1, a page description language is developed in the image RAM 123 by the CPU 121, then transmitted to the printer 13 to be printed out.

The page description language may be stored on the memory 124 so as to be later printed out as many times as needed. When the user gives an instruction to store image data, image data stored on the image RAM 123 is transferred to the memory 124 to be stored.

The operations of the image forming apparatus 1 as described above, for example reading out image data and printing out print data, will not be further described in detail because they are well-known technologies for the image forming apparatus 1.

Specifically, in this mode of implementation, the image data inputted to the image forming apparatus 1 and the image protection information generated by the image processing server 21 and the like, indicating a protected area to be prohibited from being processed next, are transferred from the image processing server 21, to the image processing server 22 then to the image processing server 23. The data communication is performed over HTTP protocol.

Figure 4:
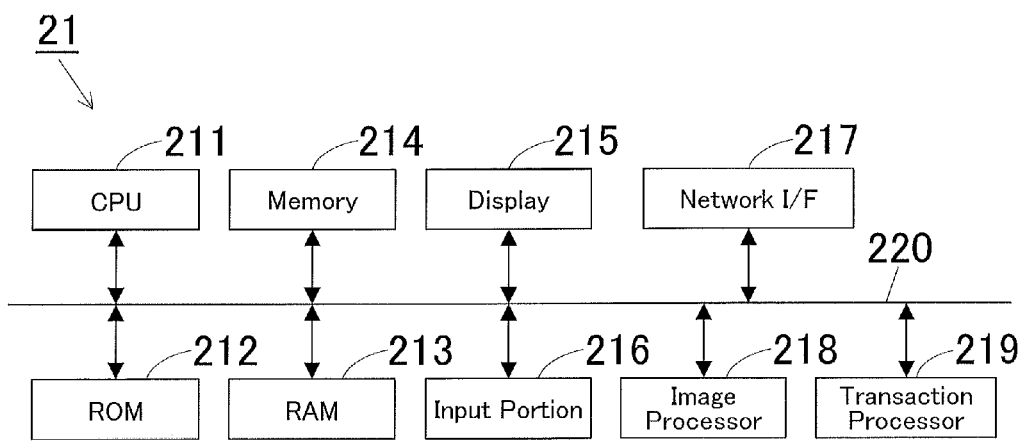
FIG. 4 is a block diagram illustrating a configuration of an image processing server.

FIG. 4 is a block diagram illustrating a configuration of the image processing servers 21, 22, and 23. Hereinafter, a configuration of the image processing server 21 will be substantially described on behalf of the image processing servers 21, 22, and 23, all of which have a common configuration.

An all-purpose computer constitutes the image processing servers 21; as illustrated in FIG. 4, the image processing server 21 is provided with: a CPU 211; a ROM 212; a RAM 213; a memory 214; a display 215; an input portion 216; a network interface (network I/F) 217; an image processor 218; a transaction processor 219; and the like, all of which are connected to each other via a system bus 220.

The CPU 211 integrally controls the entire image processing server 21 by executing operation programs stored on a recording medium such as the ROM 212. Specifically, in this mode of implementation, the CPU 211 calculates a protected area to be prohibited from being processed next, which needs to be processed now, to generate image protection information, although it depends on the image processing operation to be performed now.

The CPU 211 further performs an image processing operation on the target area by the image processor 218, and transmits the obtained image data, the generated image protection information, and the like to the image processing server which is charge of the next image processing operation. And then the CPU 211 charges a fee for the finished operation by the transaction processor 219.

If receiving image data and image protection information from an image processing server which is in charge of the previous image processing service, the CPU 211 performs an image processing operation on the image data excluding the protected area.

The ROM 212 is a recording medium which stores programs and other data for the CPU 211 to execute processing.

The RAM 213 is a recording medium which provides a work area for the CPU 211 to execute processing according to an operation program.

A hard disk drive, for example, constitutes the memory 214; the memory 214 stores application programs and other various types of data.

A CRT display or a liquid-crystal display constitutes the display 215; the display 215 displays various messages, entry accepting screens, selection screens, and other screens for users.

The entry portion 216, which serves users to perform input operations, is provided with a keyboard, a mouse, and the like.

The network interface 217 serves as a communicator which transmits and receives data with the image forming apparatus 1, the image processing servers 22 and 23, the terminals 31 and 32, and other external machines, via the network 4.

The image processor 218 performs a predetermined image processing operation on target image data under control of the CPU 211.

The transaction processor 219 processes a transaction to charge for the code merging operation finished by the image processor 218.

The following is the overview of the operations of the image processing system of FIG. 1.

Figure 5:
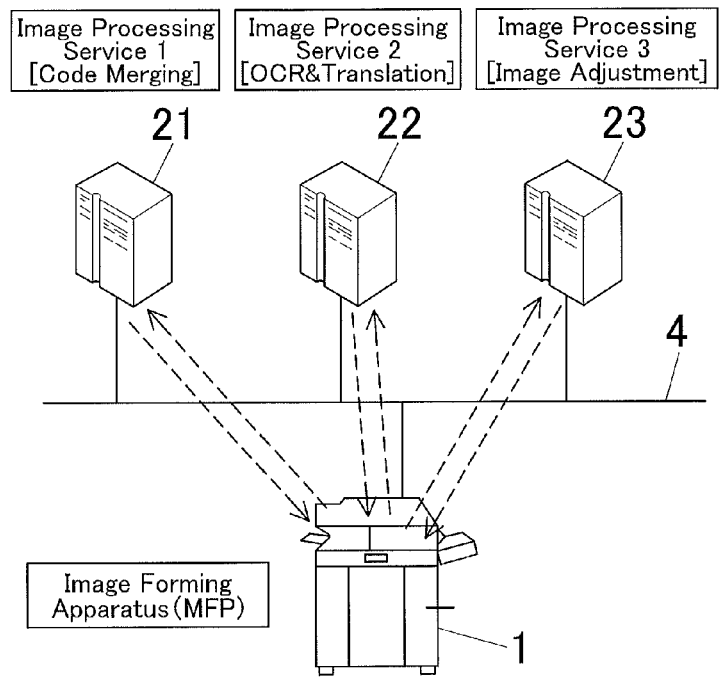
FIG. 5 is a view to explain the overview of the operations performed by the image processing system of FIG. 1.

Initially, as illustrated in FIG. 5, the image forming apparatus 1 obtains the details of the available image processing services by accessing the image processing servers 21, 22, and 23 over HTTP protocol, and registers the available image processing services on the image forming apparatus 1 itself.

Figure 6:
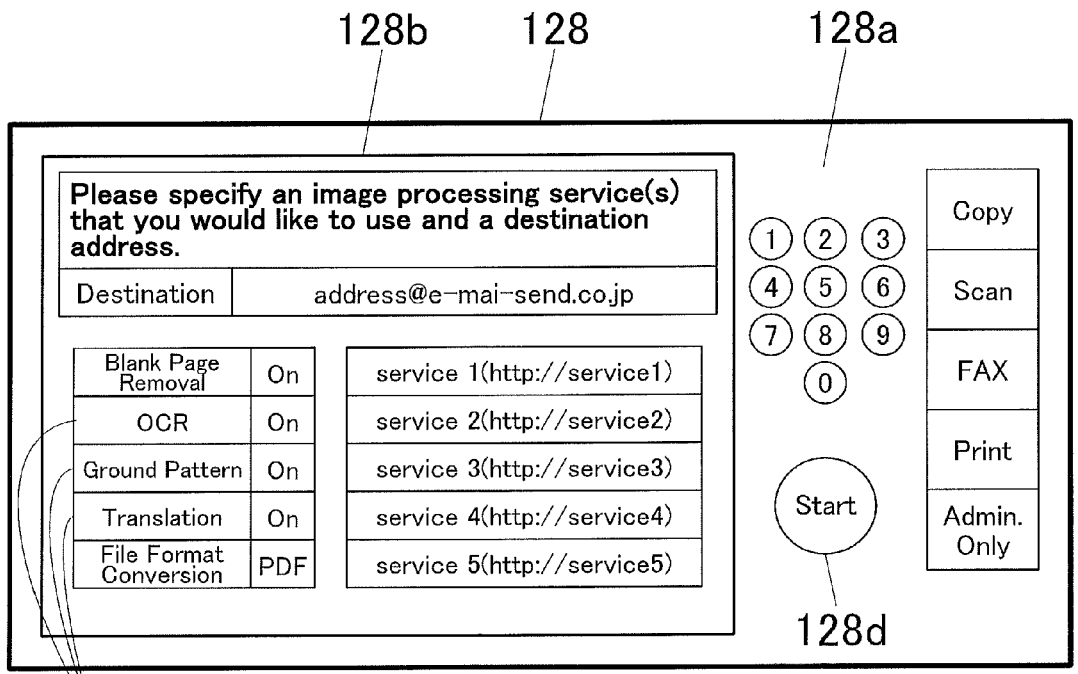
FIG. 6 is a plain view illustrating an operation panel which displays keys for selecting an image processing service.

When the available image processing services are successfully registered on the image forming apparatus 1, keys 128c for selecting an image processing service appear on the display 128b of the operation panel 128, as illustrated in FIG. 6. The user selects desirable image processing services and starts the operations by pressing the Start key 128d.

At the time of registration of the available image processing services, the image forming apparatus 1 receives notices of "function", "location", and the like of the available image processing services, and stores them on itself.

The image forming apparatus 1 generates service information which includes the user's specified image processing services and order information indicating the order of the image processing services. As indicated by an Arrow a1, the generated service information is transmitted to the image processing server 21 which is in charge of the first image processing service. After that, it is transferred to the image processing server 22, then further transferred to the image processing server 23, according to the order of the image processing services indicated by the service information. Also, target image data (also to be referred to as document image) is transferred to the next destination by the image processing servers 21, 22, and 23 according to the order of the image processing services indicated by the service information.

Figures 7, 8, 9:
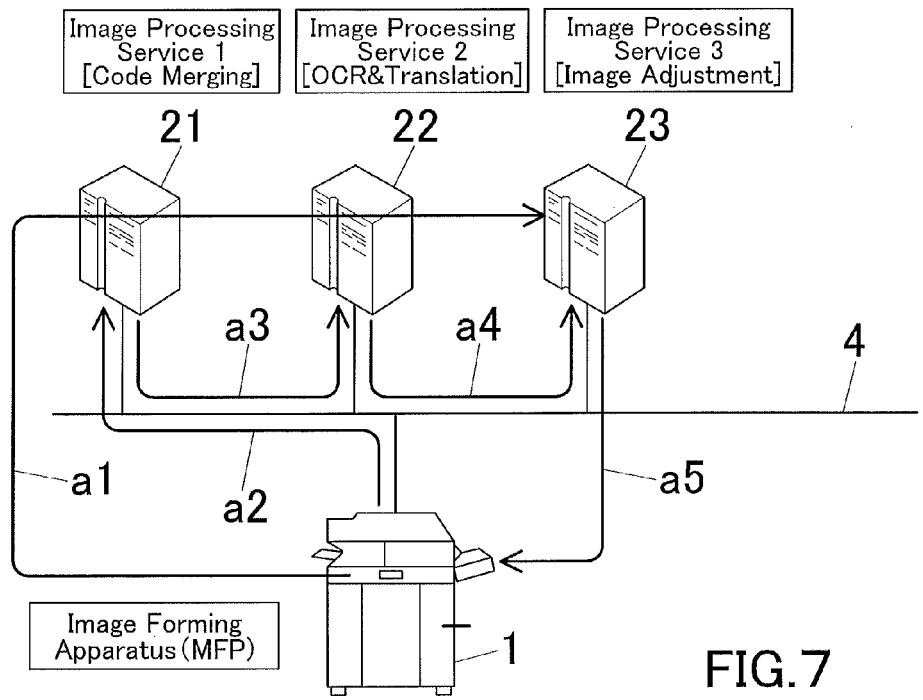
FIG. 7 is a view illustrating how to transfer service information to the image processing apparatuses.
FIG. 8 is a view illustrating one example of service information.
FIG. 9 is a view illustrating one example of protected image information.

FIG. 8 illustrates one example of service information. In this example, service information is a table consisting of: image processing services; the order of the image processing services; and the addresses of the transfer ports of the image processing servers 21, 22, and 23 which are in charge of the image processing services.

As indicated by an Arrow a2 of FIG. 7, the image forming apparatus 1 transmits a document image to the image processing server 21 which is in charge of the first image processing service.

The image processing server 21 executes its own image processing service, i.e. performs a code merging operation on the document image. More specifically, in this code merging operation, a target character string such as a security code or a copy tracking code; a target image including a character string; a target barcode representing a code; a target QR code; or a target two-dimensional code is merged to the document image.

After that, however, if the image processing server 22 performs an optical character recognition and translation operation on the document image and/or the image processing server 23 performs an image adjustment operation on the document image, the target character string, the target image, the target barcode, the target QR code, or the two-dimensional code merged to the document image will be an unintended form.

To resolve this trouble, in this mode of implementation, the image processing server 21 further generates image protection information defining the target character string, the target image, the target barcode, the target QR code, or the target two-dimensional code merged to the document image, as a protected area to be prohibited from being processed next, while performing a code merging operation on the document image. In this mode of implementation, the image forming apparatus 1 specifies a target area whose image needs to be processed by the image processing server 21, which exactly corresponds to a protected area to be prohibited from being processed by the other image processing servers.

FIG. 9 illustrates one example of image protection information. As illustrated in FIG. 9, a protected area consists of a page number and a set of coordinates representing an area. There may be multiple protected areas.

The image processing servers have been set in advance to whether or not to generate image protection information which depends on the type of their image processing operations.

After the code merging operation, the transaction processor 219 processes a transaction to charge for the finished operation. And as indicated by an Arrow a3 of FIG. 7, the document image obtained by the code merging operation, the generated image protection information, and the like are transferred to the image processing server 22 which is in charge of the next image processing service, according to the order of the image processing services indicated by the service information received from the image forming apparatus 1.

Receiving the document image, the image protection information, and the like, the image processing server 22 executes its own image processing service, i.e. performs an optical character recognition and translation operation on the document image excluding the protected area indicated by the image protection information. In this way described above, the image processing server 22 performs an image processing operation on the image data excluding a protected area indicated by image protection information, and the user therefore can obtain image data as originally intended without being afraid if the image data could be unfavorably converted depending on the order of the image processing operations.

After the optical character recognition and translation operation, the image processing server 22 processes a transaction to charge for the finished operation. Specifically, having properly performed the image processing operation on the image data excluding a protected area indicated by image protection information, the image processing server 22 processes a transaction to charge for performing the operation on the image data excluding the protected area, never including the protected data.

Also after the optical character recognition and translation operation, as indicated by an Arrow a4 of FIG. 7, the document image obtained by the image processing operation, the image protection information originated from the image processing server 21, and the like are transferred to the image processing server 23 which is in charge of the next image processing service, according to the order of the image processing services indicated by the service information.

Receiving the document image, the image protection information, and the like, the image processing server 23 executes its own image processing service, i.e. performs an image adjustment operation on the document image excluding the protected area indicated by the image protection information, and after that, processes a transaction to charge for the finished operation.

Also after the image adjustment operation, the image processing server 23 identifies itself as the last image processing server according to the service information originated from the image forming apparatus 1. And as indicated by an Arrow a5 of FIG. 7, the document image obtained by all the image processing operations, the image protection information, and the like are transferred to the image forming apparatus 1.

Receiving the document image and the like, the image forming apparatus 1 prints the document image by the printer 13, or alternatively transfers the document image to the terminal 31 or 32 according to user instruction.

Hereinafter, the operations of the image forming apparatus 1, and the image processing servers 21, 22, and 23 will be further described with reference to flowcharts.

The image forming apparatus 1 performs all operations under control of the CPU 121 according to an operation program stored on the program ROM 125 as described above.

Figure 10:
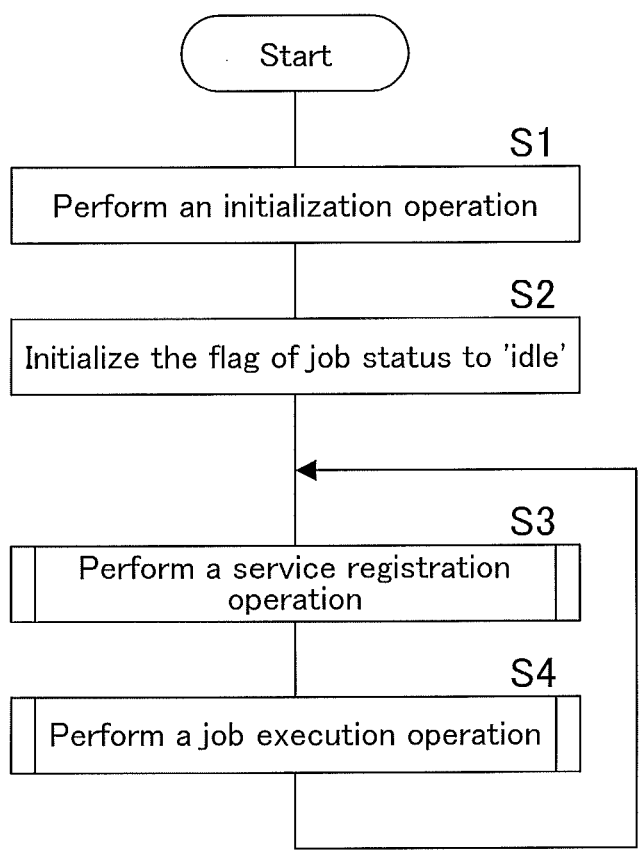
FIG. 10 is a flowchart representing a main processing routine of the image forming apparatus.

As illustrated in FIG. 10, when being provided with power, the image forming apparatus 1 performs an initialization operation, for example initializes the internal program or the hardware (Step S1). Subsequently, the image forming apparatus 1 initializes "job status" representing the status of a job to "idle" (Step S2), registers the available image processing services of the image processing servers 21, 22, and 23 on the image forming apparatus 1 itself (Step S3), and runs the job (Step S4). And the image forming apparatus 1 repeats Steps S3 and S4.

Figure 11:
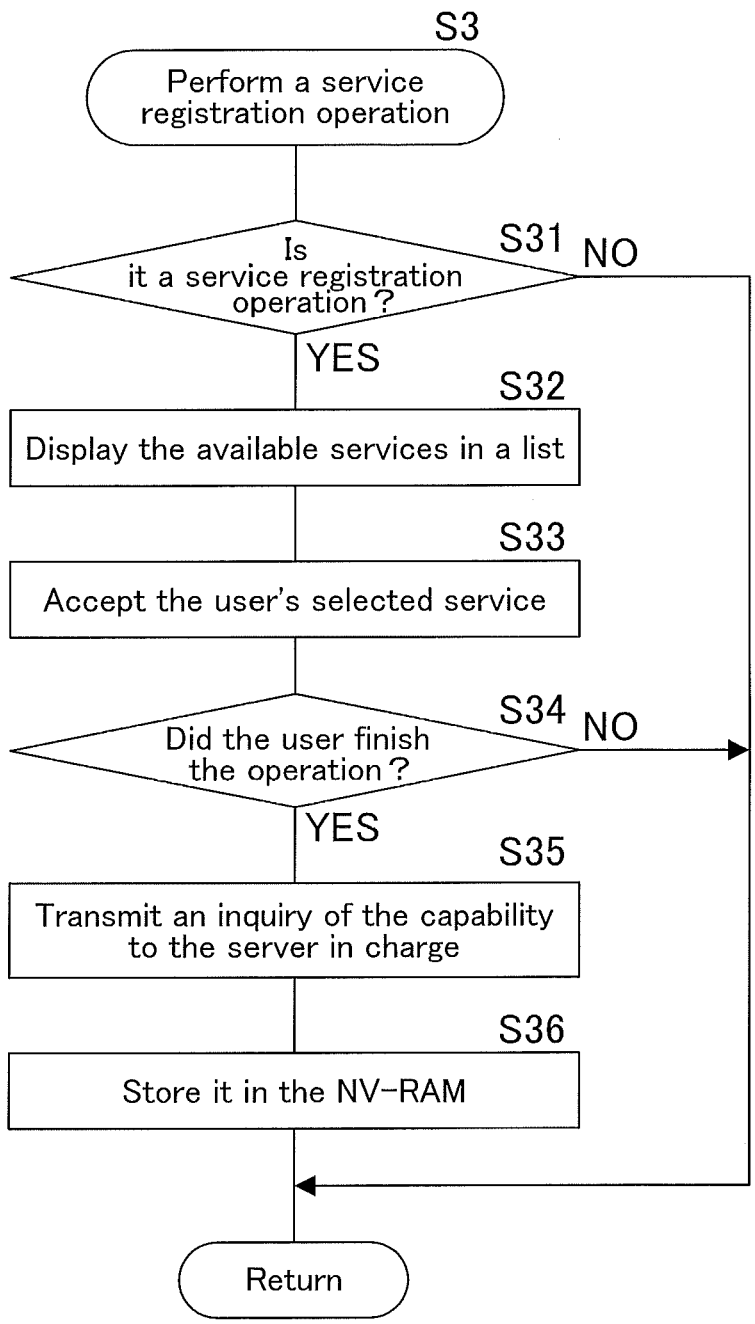
FIG. 11 is a flowchart representing a sub processing routine corresponding to a service registration operation (Step S3) in FIG. 10.

FIG. 11 is a flowchart representing a sub processing routine corresponding to a service registration operation (Step S3) in FIG. 10. It should be noted that an administrator user is required to preliminarily register the available image processing services on the image forming apparatus 1.

In Step S31, it is judged whether or not what is intended via the operation panel 128 is a service registration operation. If it is not a service registration operation, the sub processing routine returns to the main processing routine. If it is a service registration operation (YES in Step S31), the available image processing services having been registered on the image forming apparatus 1 appear in a list (the registered items can be updated). The user selects a desirable image processing service, then the selected image processing service is accepted in Step S33. And according to user manipulation, it is judged whether or not the selection is finished in Step S34. If the selection is not finished (NO in Step S34), the sub processing routine returns to the main processing routine. If the selection is finished (YES in Step S34), an inquiry of the capability about the selected image processing service is transmitted to the image processing server in charge in Step S35, and the obtained information is stored on the NV-RAM 129 in Step S36.

Figure 12:
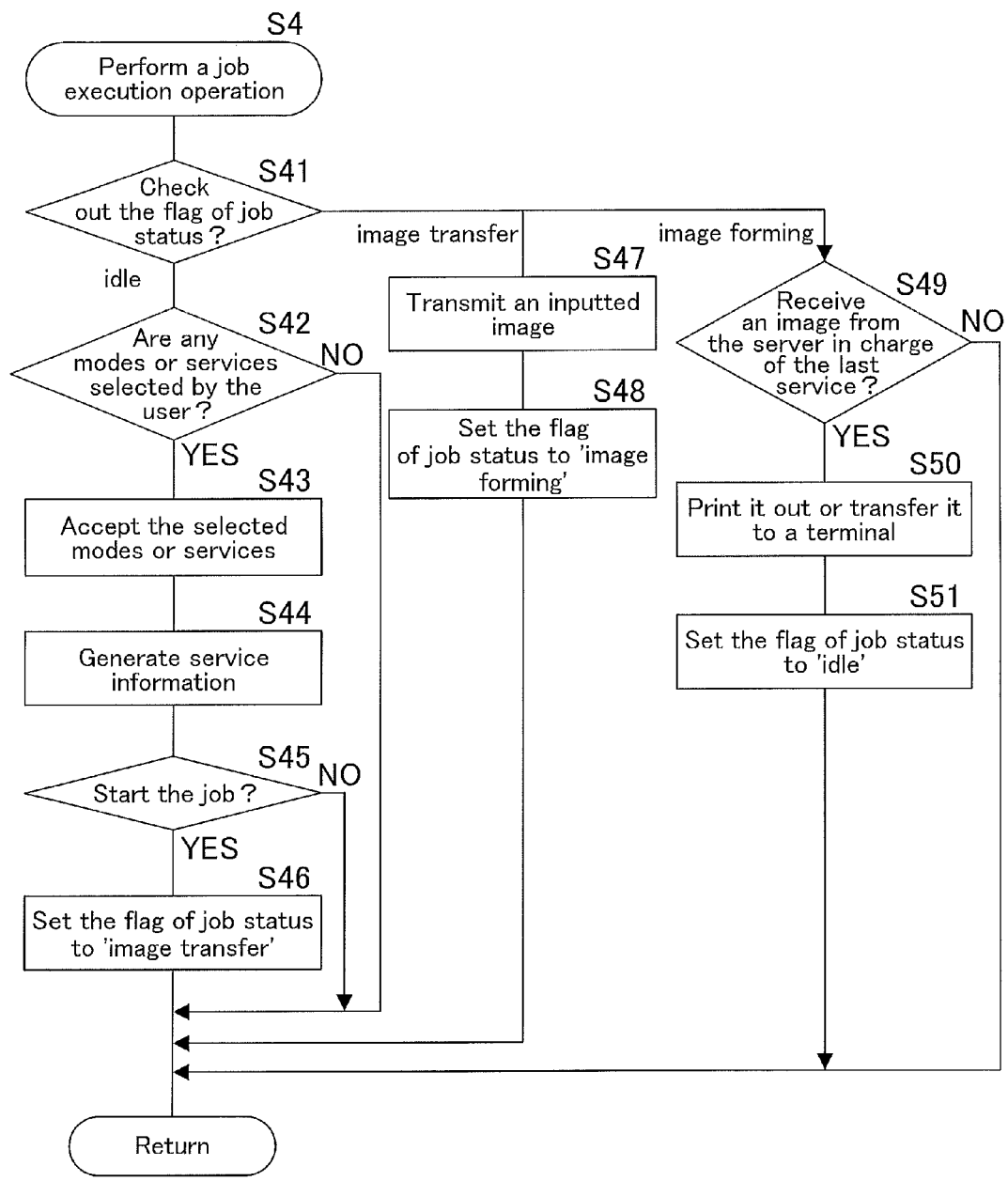
FIG. 12 is a flowchart representing a sub processing routine corresponding to a job execution operation (Step S4) in FIG. 10.

FIG. 12 is a flowchart representing a sub processing routine to select desirable image processing services and execute the jobs accordingly, corresponding to the job execution operation (Step S4) in FIG. 10.

The flag of "job status" is checked out, and the sub processing routine proceeds to different steps depending on the job status: "idle", "image transfer", or "image forming", in Step S41.

If the flag of "job status" is "idle" in Step S41, it is judged in Step S42 whether or not any modes or image processing services are selected by the user via the operation panel 128. If no modes or image processing services are selected (NO in Step S42), the sub processing routine returns to the main processing routine. If any modes or image processing services are selected (YES in Step S42), the modes or image processing services selected via the operation panel 128 are accepted in Step S43, and service information is generated in Step S44.

Subsequently, it is judged in Step S45 whether or not the Start key is pressed by the user, in other words, there is an instruction to start the job. If there is no such instruction (NO in Step S45), the sub processing routine returns to the main processing routine. If there is such an instruction (YES in Step S45), the flag of "job status" is set to "image transfer" in Step S46, and then the sub processing routine returns to the main processing routine.

If the flag of "job status" is "image transfer" in Step S41, the sub processing routine proceeds to Step S47, in which an inputted document image is transmitted to the network. The inputted document image may be image data read out from a document by the scanner 11 or print image received from the terminal 31 or 32.

After the document image is transmitted, the flag of "job status" is set to "image forming" in Step S48, and then the sub processing routine returns to the main processing routine.

If the flag of "job status" is "image forming" in Step S41, the sub processing routine proceeds to Step S49, in which it is judged whether or not the document image has been received from the image processing server 23 which is in charge of the last image processing service.

If the document image has not been received yet (NO in Step S49), the sub processing routine returns to the main processing routine. If the document image has been received (YES in Step S49), the received document image is printed out by the printer 13, or alternatively transferred to the terminal 31 or 32 according to user instruction in Step S50. Subsequently, the flag of "job status" is set to "idle" in Step S51, and then the sub processing routine returns to the main processing routine.

Figure 13:
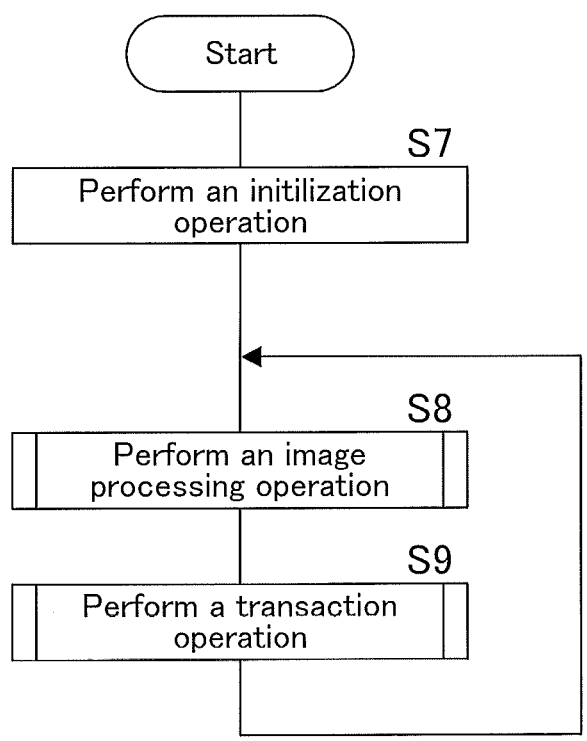
FIG. 13 is a flowchart representing a main processing routine of the image processing server.
Figure 14:
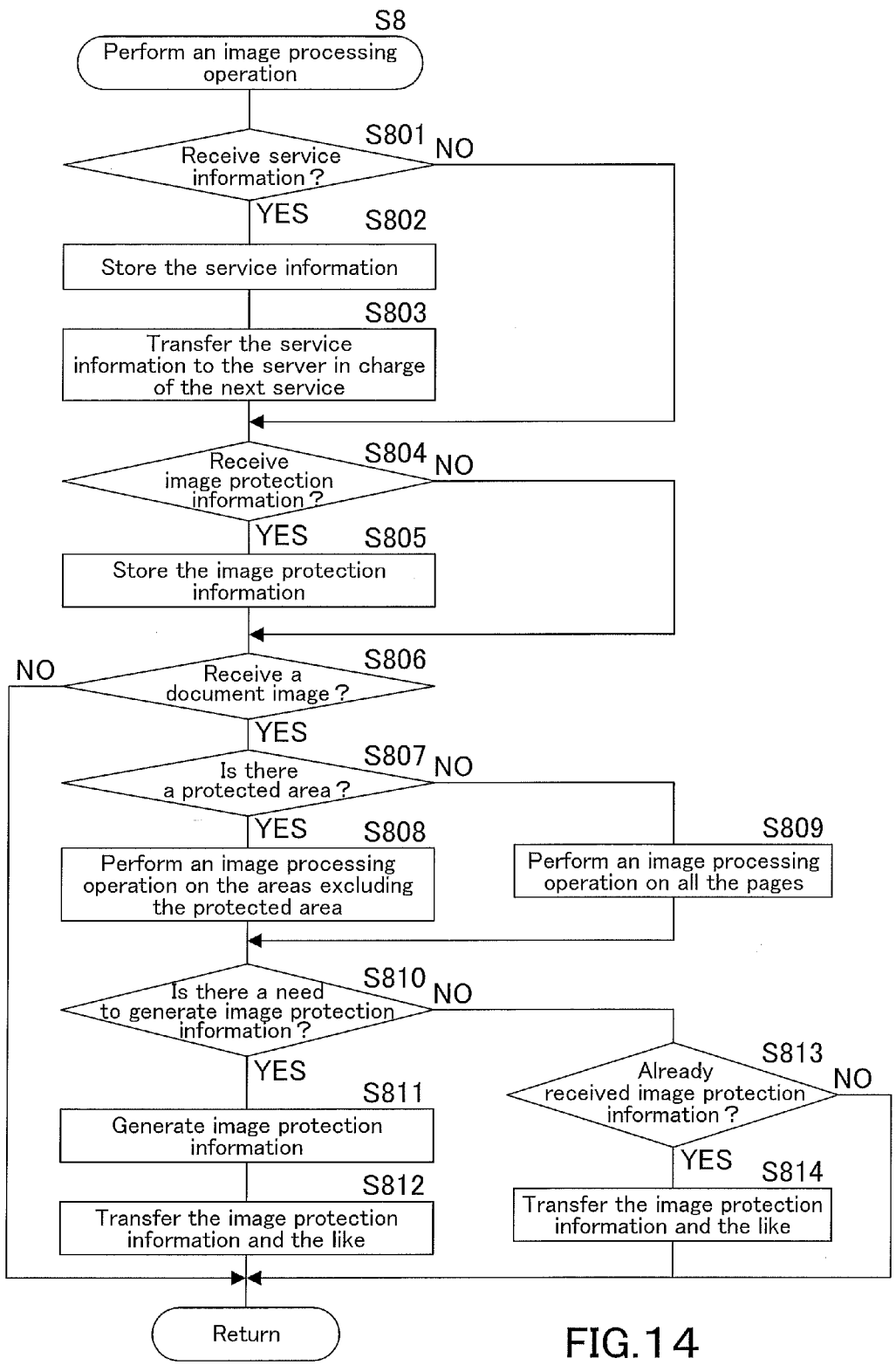
FIG. 14 is a flowchart representing a sub processing routine corresponding to an image processing operation (Step S8) in FIG. 13.
Figure 15:
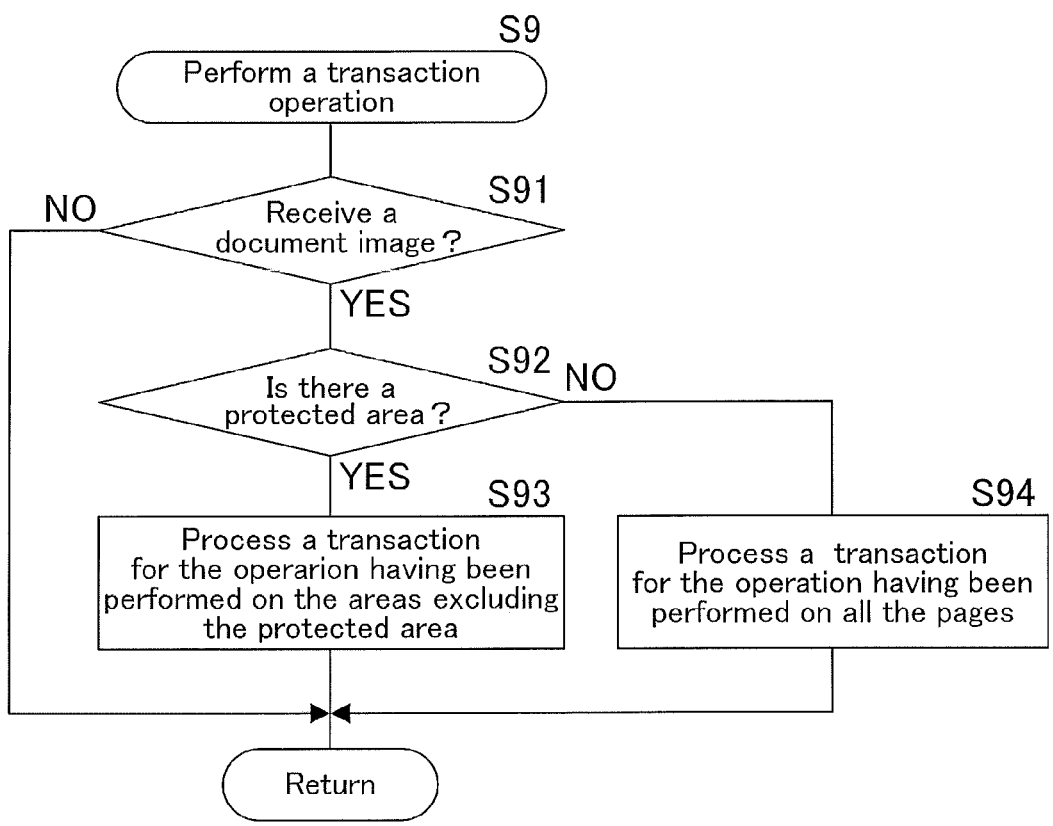
FIG. 15 is a flowchart representing a sub processing routine corresponding to a transaction processing operation (Step S9) in FIG. 13.

FIGS. 13, 14, and 15 are flowcharts to further describe the operations of the image processing servers 21, 22, and 23. The image processing servers 21, 22, and 23 perform all operations under control of their own CPUs 211 according to operation programs stored on their own recording mediums such as the ROMs 212 or the memories 214.

FIG. 13 is a flowchart representing a main processing routine thereof.

The image processing servers 21, 22, and 23 individually perform an initialization operation (Step S7), an image processing operation (Step S8), and a transaction processing operation (Step S9). Here, the image processing servers 21, 22, and 23 may be configured to perform the image processing operation (Step S8) and the transaction processing operation (Step S9) in another process.

FIG. 14 is a flowchart representing a sub processing routine corresponding to the image processing operation (Step S8) in FIG. 13.

In Step S801, it is judged whether or not service information is received from the image forming apparatus 1. If service information is received (YES in Step S801), it is stored in Step S802, and directly transferred to the image processing server which is in charge of the next image processing service written in the service information in Step S803. And then, the sub processing routine proceeds to Step S804. If the service information does not in include the next image processing service, it is not transferred to anywhere. On the other hand, if service information is not received (NO in Step S801), the sub processing routine proceeds directly to Step S804.

In Step S804, it is judged whether or not image protection information is further received. If the image protection information is received (YES in Step S804), it is stored on the memory 214 in Step S805, and then the sub processing routine proceeds to Step S806. If the image protection information is not received (NO in Step S804), the sub processing routine proceeds directly to the Step S806.

In Step S806, it is judged whether or not a document image is further received, and if it is not received (NO in Step S806), the sub processing routine returns to the main processing routine. If a document image is received (YES in Step S806), it is stored if needed, and then in Step S807, it is judged whether or not the image protection information includes a protected area. If the image protection information includes a protected area (YES in Step S807), an image processing operation is performed on the document image excluding the protected area in Step S808, and then the sub processing routine proceeds to Step S810. If the image protection information does not include a protected area (NO in Step S807), an image processing operation is performed on all pages of the document image in Step S809, and then the sub processing routine proceeds to Step S810.

In Step S810, it is judged whether or not there is a need to generate image protection information, which depends on the image processing operation. If there is such a need (YES in Step S810), image protection information is generated in Step S811, and the image protection information, the document image, and the like are transferred to the image processing server which is in charge of the next image processing service in Step S812. And then, the sub processing routine returns to the main processing routine.

In Step S810, if there is no need to generate image protection information (NO in Step S810), then it is judged in Step S813 whether or not image protection information has been received. If image protection information has been received (YES in Step S813), it is transferred directly to the image processing server which is in charge of the next image processing service in Step S814. And then, the sub processing routine returns to the main processing routine. If no image protection information has been received (NO in Step S813), the sub processing routine immediately returns to the main processing routine.

FIG. 15 is a flowchart representing a sub processing routine corresponding to the transaction processing operation (Step S9) in FIG. 13.

In Step S91, it is judged whether or not a document image is received, and if it is not received (NO in Step S91), the sub processing routine immediately returns to the main processing routine. If it is received (YES in Step S91), then it is judged in Step S92 whether or not the document image has a protected area. If the document image has a protected area (YES in Step S92), a transaction processing operation is performed on the document image excluding the protected area in Step S93. And then the sub processing routine returns to the main processing routine. If the document image has no protected area (NO in Step S92), a transaction processing operation is performed on all pages of the document image in Step S94. And then the sub processing routine returns to the main processing routine.

The mode of implementing the present invention has been described in the foregoing specification, which does not mean that the present invention shall be construed as limited to the particular forms disclosed.

Figure 16:
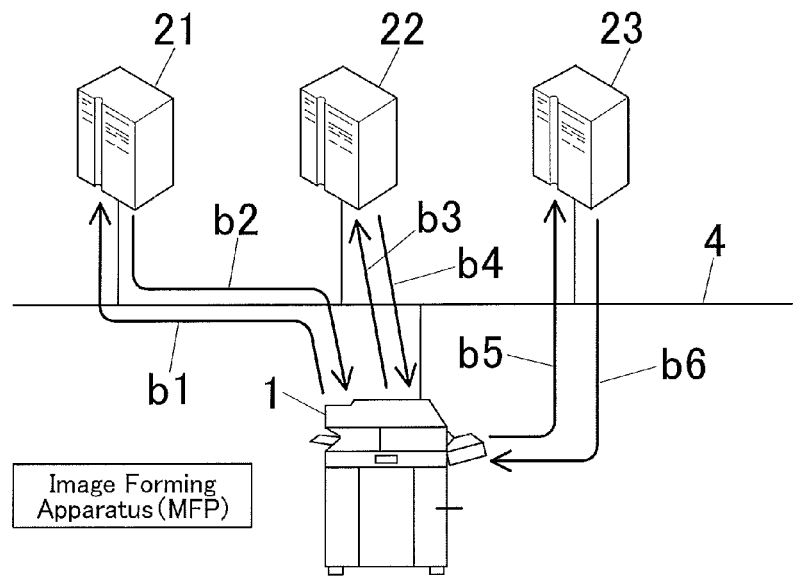
FIG. 16 is a view to explain how to transfer image data and protected image information to the image forming apparatuses in the image processing system.

For example, in this mode of implementation, the image processing servers 21, 22, and 23 transfer document image and image protection information to the next destination according to the service information indicating the order of image processing services, which is originated from the image forming apparatus 1. Alternatively, as illustrated in FIG. 16, the image forming apparatus 1 may transfer document image and image protection information to the next destination everytime receiving them returned from the image processing severs 21, 22, and 23.

More specifically, the image forming apparatus 1 transmits a target document image to the image processing server 21 which is in charge of the first image processing service (Arrow b1 of FIG. 16), and the image processing server 21 performs an image processing operation on the document image, generate image protection information, and performs a transaction processing operation. And then, the image processing server 21 transfers the obtained document image and the generated image protection information to the image forming apparatus 1 (Arrow b2 of FIG. 16).

Receiving the document image and the image protection information from the image processing server 21, the image forming apparatus 1 sends them to the image processing server 22 which is in charge of the next image processing service (Arrow b3). The image processing server 22 performs an image processing operation on the document image excluding a protected area and a transaction processing operation. And then, the image processing server 22 transfers the obtained document image and the generated image protection information to the image forming apparatus 1 (Arrow b4).

Similarly, receiving the document image and the image protection information from the image processing server 22, the image forming apparatus 1 transfers them to the image processing server 23 which is in charge of the next image processing service (Arrow b5). The image processing server 23 performs an image processing operation on the document image excluding a protected area and a transaction processing operation. And then, the image processing server 23 transfers the obtained document image and the generated image protection information to the image forming apparatus 1 (Arrow b6).

In such a system configuration, by mediating all data communication, the image forming apparatus 1 does not have to generate service information and transmit the generated service information so that the image processing servers 21, 22, and 23 can transfer it to the next destination.

Figure 17:
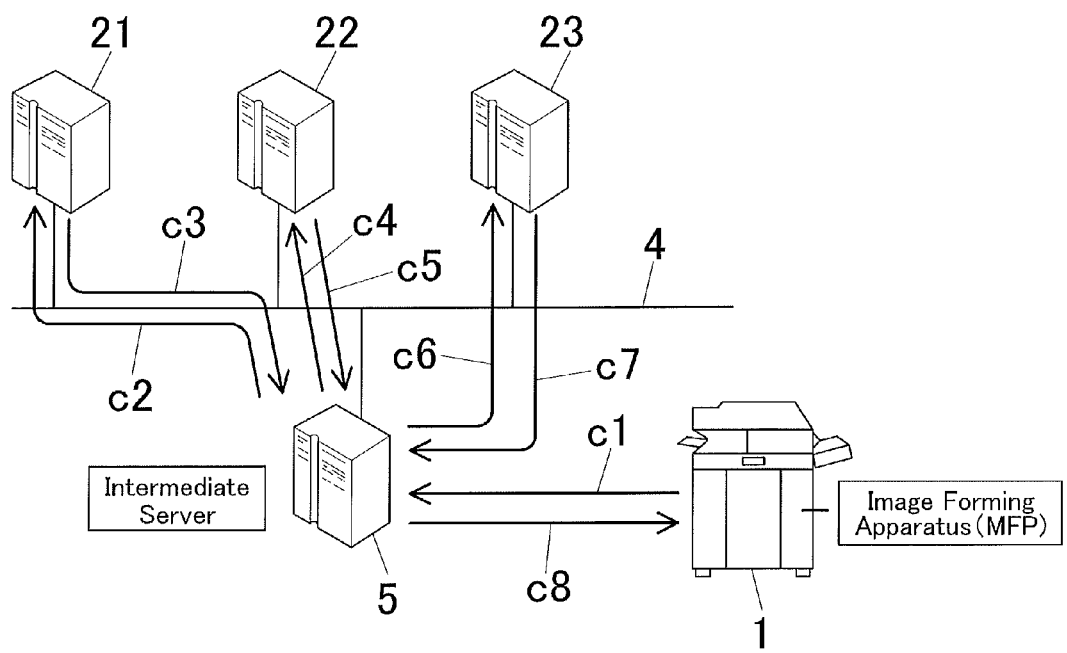
FIG. 17 is a view illustrating a configuration of the image processing system, in which an intermediate server for controlling each of the image processing servers is placed between the image forming apparatus and the group of the image processing servers.

Alternatively, as illustrated in FIG. 17, an intermediate server 5 for controlling the image processing servers 21, 22, and 23 may be employed between the image forming apparatus 1 and the group of the image processing servers 21, 22, and 23. More specifically, in this mode of implementation, the image forming apparatus 1 transmits a document image to the intermediate sever 5 (Arrow c1 of FIG. 17), and the intermediate server 5 transfers it to the image processing server 21 which is in charge of the first image processing service. And then, as indicated by Arrows c2 to c7, the image processing server 21, 22 and 23 exchanges the obtained document image and the generated image protection information back and forth with the intermediate server 5. After the last image processing operation, the intermediate server 5 transfers the obtained document image to the image forming apparatus 1 (Arrow c8).

In such a system configuration, the image forming apparatus 1 does not have to transfer a document image and the like to the image processing server 21, 22, and 23, and the image forming apparatus 1 therefore can have a more simple configuration excluding the transfer function.

Figure 18:
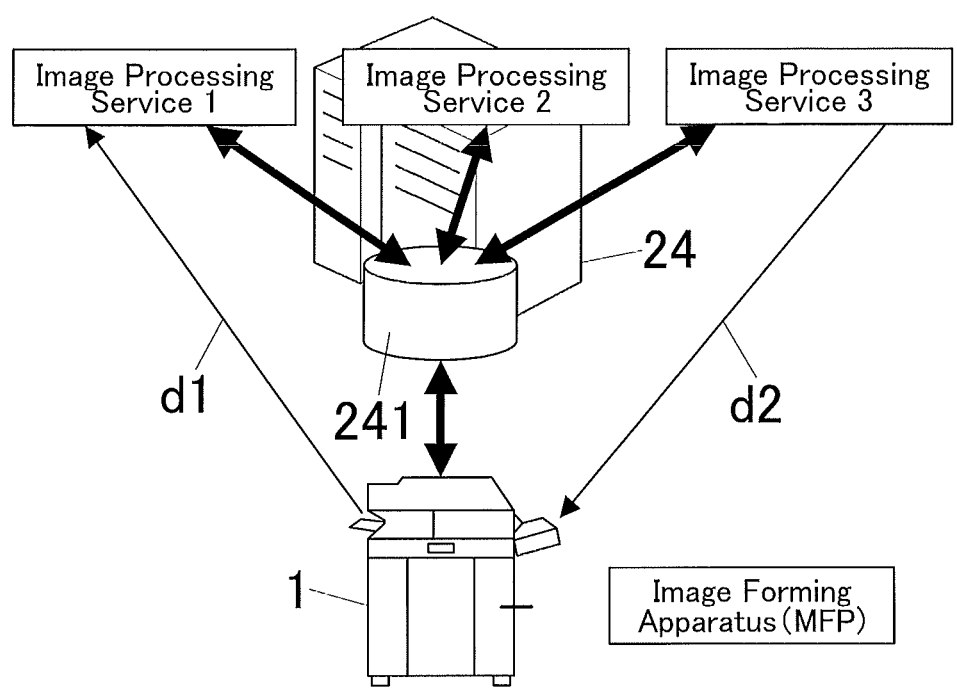
FIG. 18 is a view illustrating a configuration of the image processing system, in which one image processing server provides multiple image processing services.
Figure 19A:
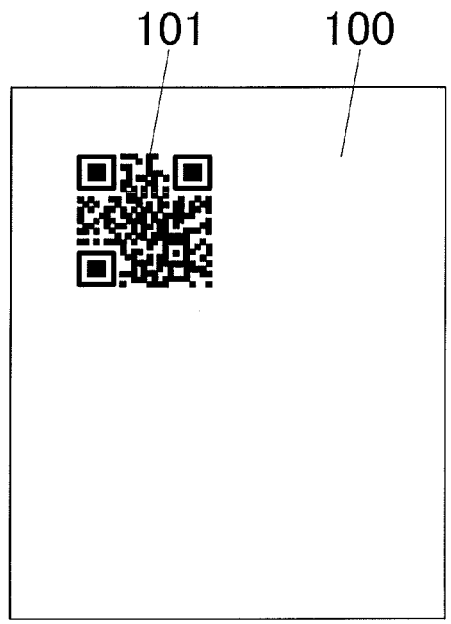
FIGS. 19 A, B and C are views to explain the problems with the conventional technologies.
Figure 19B:
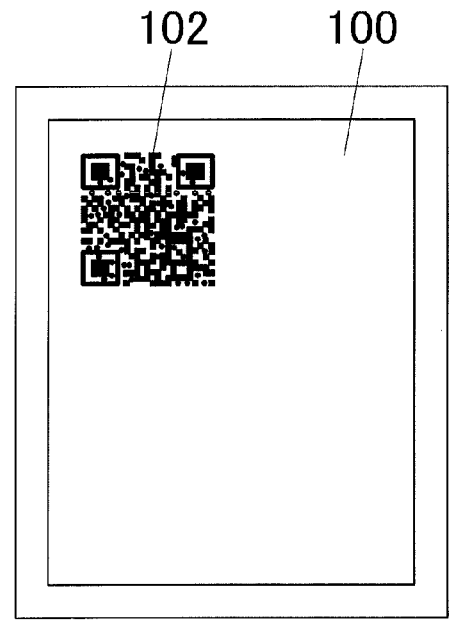
Figure 19C:
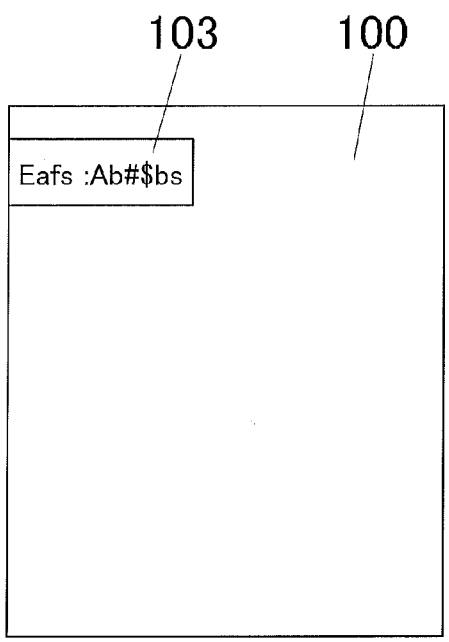

Furthermore, in the modes of implementation having been described above, the image processing servers 21, 22, and 23 are in charge of their own and different image processing services. Alternatively, as illustrated in FIG. 18, one image processing server 24 may be in charge of all multiple image processing services. In this mode of implementation, the image forming apparatus 1 transmits a document image to the image processing server 24 (Arrow d1), and the image processing server 24 performs all image processing operations on the document image according to the information stored on a storage 241. Also in this mode of implementation, like the system of FIG. 1 employing multiple image processing servers, image protection information is generated when the first image processing operation is performed, and the remaining image processing operations are prohibited from being performed on a protected area indicated by the image protection information. The image forming apparatus 1 gives an instruction to perform image processing operations simply by transmitting a document image to the image processing server 24, and the image processing server 24 internally performs handshakes on the storage 241 to exchange document image and image protection information while performing the image processing operations.

After the last image processing operation, the image processing server 24 transfers the obtained document image to the image forming apparatus 1 (Arrow d2 of FIG. 18).

In such a system configuration, one image processing server 24 performs multiple image processing operations, contributing the speed of performance because of no intermediates.

Furthermore, in the modes of implementation having been described above, one image processing server such as the image processing server 21 generates image protection information. Alternatively, two or more image processing servers may generate image protection information depending on the image processing operation. Alternatively, if knowing from the beginning, an image processing target area, i.e. an area to which a code should be merged, the user may specify on the image forming apparatus 1 a target area whose image needs to be processed by the image processing servers and a protected area to be prohibited from being processed by the same so that the image forming apparatus 1 can transmit target image data and information indicating the target area and the protected area to the image processing servers 21, 22, and 23. And the image processing servers accordingly performs image processing operations on the target area only.

Furthermore, image protection information, which is independent from a document image, is generated in the modes of implementation having been described above. Alternatively, image protection information, which constitutes a part of a document image, may be generated.

Furthermore, a transaction processing operation may be electrically performed in an alternative manner. Also, the transaction processing apparatus 6 connected to the image forming apparatus 1 as illustrated in FIG. 1, performs a transaction processing operation instead of the image processing servers 21, 22, and 23.

Furthermore, in the modes of implementation having been described above, the image processing server 21 may specify a protected area corresponding to a target area having just been processed by itself. Alternatively, the image processing server 21 may specify a protected area corresponding to only a part of a target area having just been processed by itself, because the image processing server 21 has possibilities of performing multiple image processing operations.

The present invention of the subject application having been described above may be applied to the following modes.

[1] An image processing system comprising:
an image forming apparatus; and
first and second image processing servers connected to the image forming apparatus via a network,
the first image processing server comprising:
  a first image processor which performs a first image processing operation on target image data received from the image forming apparatus; and
  a protected area calculator which calculates a protected area to be prohibited from being processed next, which is related to the area processed by the first image processor, and generates image protection information including information of the protected area, and
the second image processing server comprising a second image processor which performs a second image processing operation on the areas excluding the protected area whose information is included in the image protection information generated by the protected area calculator.

[2] The image processing system as recited in the aforementioned item [1], wherein:
the second image processing server further comprises a transaction processor which processes a transaction for an image processing operation having been performed; and
the transaction processor processes a transaction for the image processing operation having been performed on the areas excluding the protected area.

[3] The image processing system as recited in the aforementioned item [1], wherein the first image processing operation is a data merging operation to merge a data object to the target image data.

[4] The image processing system as recited in the aforementioned item [3], wherein the data object is a character string.

[5] The image processing system as recited in the aforementioned item [3], wherein the data object is an image including a character string.

[6] The image processing system as recited in the aforementioned item [3], wherein the data object is a barcode or a two-dimensional code representing a code.

[7] The image processing system as recited in the aforementioned item [1], wherein:
the image forming apparatus comprises an order information generator which generates order information indicating the order of the image processing operations to be processed by the first and second image processing servers; and
the target image data and the image protection information are transmitted from the first image processing server to the second image processing server to be processed thereby, in the order of the image processing operations to be processed, indicated by the order information generated by the order information generator.

[8] The image processing system as recited in the aforementioned item [6], wherein the first image processing server returns the target image data and the image protection information to the image forming apparatus after performing the first image processing operation, and then the image forming apparatus transfers the target image data and the image protection information received therefrom to the second image processing server.

[9] The image processing system as recited in the aforementioned item [1], wherein:
an intermediate server is provided between the image forming apparatus and the group of the first and second image processing servers; and
the first image processing server returns the target image data and the image protection information to the intermediate server after performing the first image processing operation, and then the intermediate server transfers the target image data and the image protection information received therefrom to the second image processing server.

[10] The image processing system as recited in the aforementioned item [1], wherein:
the image forming apparatus comprises a target area setting portion which determines a target area whose image needs to be processed by the first image processing server; and
the protected area calculator of the first image processing server calculates a protected area to be prohibited from being processed next, based on the target area determined by the target area setting portion of the image forming apparatus.

[11] An image processing system comprising:
an image forming apparatus; and
an image processing server connected to the image forming apparatus via a network, performing multiple image processing operations on target image data received from the image forming apparatus,
the image processing server comprising:
  a first image processor which performs a first image processing operation;
  a protected area calculator which calculates a protected area to be prohibited from being processed next, which is related to the area processed by the first image processor, and generates image protection information including information of the protected area; and
  a second image processor which subsequently performs a second image processing operation on the areas excluding the protected area whose information is included in the image protection information generated by the protected area calculator.

[12] An image processing server comprising:
an image processor which performs an image processing operation on target image data received from an image forming apparatus which is connected to the image processing server via a network;
a protected area calculator which calculates a protected area to be prohibited from being processed next, which is related to the area processed by the image processor, and generates image protection information including information of the protected area; and a transmitter which transmits the image data obtained by the image processor and the image protection information generated by the protected area calculator, to any of the following destinations: a second image processing server which subsequently performs a second image processing operation, the image forming apparatus which is allowed to transfer them to the second image processing server, and an intermediate server which is provided between the image forming apparatus and the group of the image processing servers.

[13] The image processing server as recited in the aforementioned item [12], further comprising a transaction processor which processes a transaction for an image processing operation having been performed, wherein the transaction processor processes a transaction for the image processing operation having been performed on the areas excluding the protected area.

[14] The image processing server as recited in the aforementioned item [12], wherein the image processing operation is a data merging operation to merge a data object to the target image data.

[15] The image processing server as recited in the aforementioned item [14], wherein the data object is a character string.

[16] The image processing server as recited in the aforementioned item [14], wherein the data object is an image including a character string.

[17] The image processing server as recited in the aforementioned item [14], wherein the data object is a barcode or a two-dimensional code representing a code.

[18] An image forming apparatus employed in an image processing system comprising:
the image forming apparatus; and
first and second image processing servers connected to the image forming apparatus via a network, performing different image processing operations in a predetermined order on target image data received from the image forming apparatus,
the image forming apparatus comprising:
an area setting portion which determines target areas to be processed by the first and second image processing servers and protected areas to be prohibited from being processed by the first and second image processing servers; and
a transmitter which transmits the target image data and information indicating the target areas and the protected areas both determined by the area setting portion, to the first and second image processing servers.

[19] An image processing method implemented by an image processing system comprising:
an image forming apparatus; and
first and second image processing servers connected to the image forming apparatus via a network,
the image processing method comprising:
the first image processing server's:
  performing a first image processing operation on target image data received from the image forming apparatus; and
  calculating a protected area to be prohibited from being processed next, which is related to the area processed by the first image processing operation, and generating image protection information including information of the protected area, and
the second image processing server's performing a second image processing operation on the areas excluding the protected area whose information is included in the image protection information generated by the first image processing server.

[20] A non-transitory computer-readable recording medium having an image processing program stored thereon to make a computer controlling image processing server execute:
performing an image processing operation on target image data received from an image forming apparatus connected to the image processing server via a network;
calculating a protected area to be prohibited from being processed next, which is related to the area processed by the image processing operation, and generating image protection information including information of the protected area; and
transmitting the image data obtained by the image processing operation and the generated image protection information, to any of the following destinations: a second image processing server which subsequently performs a second image processing operation, the image forming apparatus which is allowed to transfer them to the second image processing server, and an intermediate server which is provided between the image forming apparatus and the group of the image processing servers.

According to the mode of implementing the present invention as recited in the aforementioned item [1], a first image processing server which is in charge of an image processing service performs a first image processing operation on target image data, then calculates a protected area to be prohibited from being processed next, which is related to the area processed by the first image processing operation, and generates image protection information. And a second image processing server which is in charge of the next image processing service performs a second image processing operation on the areas excluding the protected area whose information is included in the image protection information generated by the first image processing server. More specifically, if the target image data could be unfavorably converted by the second image processing operation, the first image processing server having performed the first image processing operation sets a protected area so that the second image processing server will not process the protected area when performing the second image processing operation. With this mode of implementation, users do not have to be afraid any more if the target image data could be processed by the second image processing operation to be an unintended form.

According to the mode of implementing the present invention as recited in the aforementioned item [2], a transaction for an image processing operation having been performed on the areas excluding the protected area is processed, which eliminates the inconvenience that the user is overcharged for an unnecessary image processing operation.

According to the mode of implementing the present invention as recited in the aforementioned item [3], if a data object is merged to the target image data, the area in which the merged data object exists will not be processed by the next image processing operation.

According to the mode of implementing the present invention as recited in the aforementioned item [4], a character string, which is the data object merged to the target image data, will not be processed by the next image processing operation to be an unintended form.

According to the mode of implementing the present invention as recited in the aforementioned item [5], an image including a character string, which is the data object merged to the target image data, will not be processed by the next image processing operation to be an unintended form.

According to the mode of implementing the present invention as recited in the aforementioned item [6], a barcode or a two-dimensional code representing a code, which is the data object merged to the target image data, will not be processed by the next image processing operation to be unreadable.

According to the mode of implementing the present invention as recited in the aforementioned item [7], the target image data and the image protection information are transferred from the first image processing server to the second image processing server to be processed thereby, in the order of the image processing operations indicated by the order information generated by the image forming apparatus.

According to the mode of implementing the present invention as recited in the aforementioned item [8], after one image processing operation is performed on the image data, the image data obtained by the image processing operation and the image protection information are returned to the image forming apparatus, and therefrom transferred to an image processing server which is in charge of the next image processing service.

According to the mode of implementing the present invention as recited in the aforementioned item [9], after an image processing operation is performed on the image data, the image data obtained by the image processing operation and the image protection information are returned to the intermediate server, and therefrom transferred to an image processing server which is in charge of the next image processing service.

According to the mode of implementing the present invention as recited in the aforementioned item [10], a protected area to be prohibited from being processed next is calculated based on an area specified by the image forming apparatus.

According to the mode of implementing the present invention as recited in the aforementioned item [11], one image processing server which is in charge of different image processing services does not further process the protected area calculated, which has been processed by a first image processing operation, when performing a second image processing operation. With this mode of implementation, users do not have to be afraid any more if the target image data could be processed by the second image processing operation to be an unintended form.

According to the mode of implementing the present invention as recited in the aforementioned item [12], the image processing server does not further process the protected area calculated, which has been processed by a first image processing operation, when performing a second image processing operation.

According to the mode of implementing the present invention as recited in the aforementioned item [13], a transaction for an image processing operation having been performed on the areas excluding the protected area is processed, which eliminates the inconvenience that the user is overcharged for an unnecessary image processing operation.

According to the mode of implementing the present invention as recited in the aforementioned item [14], if a data object is merged to the target image data, the area in which the merged data object exists will not be processed by the next image processing operation.

According to the mode of implementing the present invention as recited in the aforementioned item [15], a character string, which is a data object merged to the target image data, will not be processed by the next image processing operation to be an unintended form.

According to the mode of implementing the present invention as recited in the aforementioned item [5], an image including a character string, which is a data object merged to the target image data, will not be processed by the next image processing operation to be an unintended form.

According to the mode of implementing the present invention as recited in the aforementioned item [17], a barcode or a two-dimensional code representing a code, which is the data object merged to the target image data, will not be processed by the next image processing operation to be unreadable.

According to the mode of implementing the present invention as recited in the aforementioned item [18], if the target image data could be unfavorably converted by the second image processing operation, the image forming apparatus sets a protected area so that the protected area will not be processed by the second image processing operation.

According to the mode of implementing the present invention as recited in the aforementioned item [19], if the target image data could be unfavorably converted by the second image processing operation, the first image processing server having performed the first image processing operation calculates a protected area so that the second image processing server will not process the protected area when performing the second image processing operation. With this mode of implementation, users do not have to be afraid any more if the target image data could be processed by the second image processing operation to be an unintended form.

According to the mode of implementing the present invention as recited in the aforementioned item [20], if the target image data could be unfavorably converted by the second image processing operation, the computer calculates a protected area so that the protected area will not be processed by the second image processing operation.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing system comprising:
   an image forming apparatus; and
   first and second image processing servers connected to the image forming apparatus via a network,
   the first image processing server comprising:
      a first image processor which performs a first image processing operation on target image data received from the image forming apparatus; and
      a protected area calculator which calculates a protected area to be prohibited from being processed next, which is related to an area processed by the first image processor, and generates image protection information including information of the protected area, and
   the second image processing server comprising a second image processor which performs a second image processing operation on areas excluding the protected area whose information is included in the image protection information generated by the protected area calculator.

2. The image processing system as recited in claim 1, wherein:
   the second image processing server further comprises a transaction processor which processes a transaction for an image processing operation having been performed; and
   the transaction processor processes a transaction for the image processing operation having been performed on the areas excluding the protected area.

3. The image processing system as recited in claim 1, wherein the first image processing operation is a data merging operation to merge a data object to the target image data.

4. The image processing system as recited in claim 3, wherein the data object is a character string.

5. The image processing system as recited in claim 3, wherein the data object is an image including a character string.

6. The image processing system as recited in claim 3, wherein the data object is a barcode or a two-dimensional code representing a code.

7. The image processing system as recited in claim 1, wherein:
   the image forming apparatus comprises an order information generator which generates order information indicating an order of the image processing operations to be processed by the first and second image processing servers; and
   the target image data and the image protection information are transmitted from the first image processing server to the second image processing server to be processed thereby, in the order of the image processing operations to be processed, indicated by the order information generated by the order information generator.

8. The image processing system as recited in claim 1, wherein the first image processing server returns the target image data and the image protection information to the image forming apparatus after performing the first image processing operation, and then the image forming apparatus transfers the target image data and the image protection information received therefrom to the second image processing server.

9. The image processing system as recited in claim 1, wherein:
   an intermediate server is provided between the image forming apparatus and a group of the first and second image processing servers; and
   the first image processing server returns the target image data and the image protection information to the intermediate server after performing the first image processing operation, and then the intermediate server transfers the target image data and the image protection information received therefrom to the second image processing server.

10. The image processing system as recited in claim 1, wherein:
    the image forming apparatus comprises a target area setting portion which determines a target area whose image needs to be processed by the first image processing server; and
    the protected area calculator of the first image processing server calculates the protected area to be prohibited from being processed next, based on the target area determined by the target area setting portion of the image forming apparatus.

11. An image processing system comprising:
    an image forming apparatus; and
    an image processing server connected to the image forming apparatus via a network, performing multiple image processing operations on target image data received from the image forming apparatus,
    the image processing server comprising:
       a first image processor which performs a first image processing operation;
       a protected area calculator which calculates a protected area to be prohibited from being processed next, which is related to an area processed by the first image processor, and generates image protection information including information of the protected area; and
       a second image processor which subsequently performs a second image processing operation on areas excluding the protected area whose information is included in the image protection information generated by the protected area calculator.

12. An image processing server comprising:
    an image processor which performs an image processing operation on target image data received from an image forming apparatus which is connected to the image processing server via a network;
    a protected area calculator which calculates a protected area to be prohibited from being processed next, which is related to an area processed by the image processor, and generates image protection information including information of the protected area; and
    a transmitter which transmits the target image data processed by the image processor and the image protection information generated by the protected area calculator, to any of the following destinations: a second image processing server which subsequently performs a second image processing operation, the image forming apparatus which is allowed to transfer the target image data and the generated image protection information to the second image processing server, and an intermediate server which is provided between the image forming apparatus and the group of the image processing servers.

13. The image processing server as recited in claim 12, further comprising a transaction processor which processes a transaction for an image processing operation having been performed, wherein the transaction processor processes a transaction for the image processing operation having been performed on areas excluding the protected area.

14. The image processing server as recited in claim 12, wherein the image processing operation is a data merging operation to merge a data object to the target image data.

15. The image processing server as recited in claim 14, wherein the data object is a character string.

16. The image processing server as recited in claim 14, wherein the data object is an image including a character string.

17. The image processing server as recited in claim 14, wherein the data object is a barcode or a two-dimensional code representing a code.

18. An image forming apparatus employed in an image processing system comprising:
the image forming apparatus; and
first and second image processing servers connected to the image forming apparatus via a network, performing different image processing operations in a predetermined order on target image data received from the image forming apparatus,
the image forming apparatus comprising:
an area setting portion which determines target areas to be processed by the first and second image processing servers and protected areas to be prohibited from being processed by the first and second image processing servers; and
a transmitter which transmits the target image data and information indicating the target areas and the protected areas both determined by the area setting portion, to the first and second image processing servers.

19. An image processing method implemented by an image processing system comprising:
an image forming apparatus; and
first and second image processing servers connected to the image forming apparatus via a network,
the image processing method comprising:
the first image processing server is:
performing a first image processing operation on target image data received from the image forming apparatus; and
calculating a protected area to be prohibited from being processed next, which is related to an area processed by the first image processing operation, and generating image protection information including information of the protected area, and
the second image processing server is performing a second image processing operation on areas excluding the protected area whose information is included in the image protection information generated by the first image processing server.

20. A non-transitory computer-readable recording medium having an image processing program stored thereon to make a computer controlling an image processing server execute:
performing an image processing operation on target image data received from an image forming apparatus connected to the image processing server via a network;
calculating a protected area to be prohibited from being processed next, which is related to an area processed by the image processing operation, and generating image protection information including information of the protected area; and
transmitting the target image data processed by the image processing operation and the generated image protection information, to any of the following destinations: a second image processing server which subsequently performs a second image processing operation, the image forming apparatus which is allowed to transfer the target image data and the generated image protection information to the second image processing server, and an intermediate server which is provided between the image forming apparatus and a group of the image processing servers.

* * * * *